United States Patent
Watanabe et al.

(10) Patent No.: US 11,959,156 B2
(45) Date of Patent: Apr. 16, 2024

(54) CUBIC BORON NITRIDE SINTERED MATERIAL AND CUTTING TOOL INCLUDING SAME

(71) Applicants: SUMITOMO ELECTRIC INDUSTRIES, LTD., Osaka (JP); SUMITOMO ELECTRIC HARDMETAL CORP., Hyogo (JP)

(72) Inventors: Yuichiro Watanabe, Osaka (JP); Katsumi Okamura, Osaka (JP); Akito Ishii, Osaka (JP); Yoshiki Asakawa, Hyogo (JP); Akihiko Ueda, Hyogo (JP); Satoru Kukino, Hyogo (JP); Hisaya Hama, Hyogo (JP)

(73) Assignees: Sumitomo Electric Industries, Ltd., Osaka (JP); SUMITOMO ELECTRIC HARDMETAL CORP., Hyogo (JP)

( * ) Notice: Subject to any disclaimer, the term of this patent is extended or adjusted under 35 U.S.C. 154(b) by 0 days.

(21) Appl. No.: 17/910,801

(22) PCT Filed: Jul. 30, 2021

(86) PCT No.: PCT/JP2021/028503
§ 371 (c)(1),
(2) Date: May 3, 2023

(87) PCT Pub. No.: WO2022/025293
PCT Pub. Date: Feb. 3, 2022

(65) Prior Publication Data
US 2023/0295779 A1     Sep. 21, 2023

(30) Foreign Application Priority Data
Jul. 31, 2020    (JP) ................... 2020-130673

(51) Int. Cl.
*B23B 27/14*      (2006.01)
*B22F 7/00*      (2006.01)
*C22C 29/16*      (2006.01)

(52) U.S. Cl.
CPC ............... *C22C 29/16* (2013.01); *B22F 7/008* (2013.01); *B23B 27/148* (2013.01); *B22F 2207/01* (2013.01); *B22F 2301/205* (2013.01); *B22F 2302/205* (2013.01); *B23B 2226/125* (2013.01)

(58) Field of Classification Search
CPC ................................................ B23B 27/148
See application file for complete search history.

(56) References Cited

U.S. PATENT DOCUMENTS

| | | | |
|---|---|---|---|
| 3,767,371 A * | 10/1973 | Wentorf, Jr. | B23B 27/148 264/642 |
| 2005/0050801 A1 * | 3/2005 | Cho | B22F 7/062 428/548 |
| 2008/0214383 A1 | 9/2008 | Matsukawa et al. | |
| 2013/0000213 A1 | 1/2013 | Okamura et al. | |
| 2016/0052827 A1 | 2/2016 | Matsuda et al. | |
| 2019/0076920 A1 | 3/2019 | Ishii et al. | |
| 2019/0118344 A1 | 4/2019 | Dues et al. | |
| 2021/0094882 A1 | 4/2021 | Okamura et al. | |
| 2021/0246078 A1 | 8/2021 | Okamura et al. | |
| 2021/0246536 A1 | 8/2021 | Okamura et al. | |
| 2022/0025490 A1 | 1/2022 | Okamura et al. | |

FOREIGN PATENT DOCUMENTS

| | | |
|---|---|---|
| EP | 2631027 A1 | 8/2013 |
| JP | 2019-77942 A | 5/2019 |
| WO | 2005/066381 A1 | 7/2005 |
| WO | 2020/059754 A1 | 3/2020 |
| WO | 2020/059755 A1 | 3/2020 |
| WO | 2020/059756 A1 | 3/2020 |

* cited by examiner

*Primary Examiner* — Alexandra M Moore
(74) *Attorney, Agent, or Firm* — Renner, Otto, Boisselle & Sklar, LLP

(57) ABSTRACT

A cubic boron nitride sintered material comprises cubic boron nitride particles and a bonding material, wherein the bonding material comprises at least one first metallic element selected from the group consisting of titanium, zirconium, vanadium, niobium, hafnium, tantalum, chromium, rhenium, molybdenum, and tungsten; cobalt; and aluminum; the cubic boron nitride sintered material has a first interface region sandwiched between an interface between the cubic boron nitride particles and the bonding material, and a first virtual line passing through a point 10 nm apart from the interface to the bonding material side; and when an element that is present at the highest concentration among the first metallic elements in the first interface region is defined as a first element, an atomic concentration of the first element in the first interface region is higher than an atomic concentration of the first element in the bonding material excluding the first interface region.

6 Claims, No Drawings

CUBIC BORON NITRIDE SINTERED MATERIAL AND CUTTING TOOL INCLUDING SAME

TECHNICAL FIELD

The present disclosure relates to a cubic boron nitride sintered material and a cutting tool including the same. The present application claims priority based on Japanese Patent Application No. 2020-130673 filed on Jul. 31, 2020. The contents described in the Japanese Patent Application are incorporated herein by reference in its entirety.

BACKGROUND ART

As a high hardness material used for cutting tools and the like, a cubic boron nitride sintered material (hereinafter, also referred to as the "cBN sintered material") is known. cBN sintered material usually includes cubic boron nitride particles (hereinafter, also referred to as the "cBN particles") and a bonding material, and the characteristics thereof tend to be different depending on the content ratio of cBN particles.

Hence, in the field of cutting and processing, different types of cBN sintered bodies are applied to cutting tools and used depending on the material of the work materials, processing accuracy to be required, and the like. For example, cBN sintered material having a high content ratio of cubic boron nitride (hereinafter, also referred to as "cBN") (hereinafter, also referred to as the "High-cBN sintered material") can be suitably used for cutting of sintered alloys and the like.

However, the High-cBN sintered material tends to generate unexpected chipping. This is considered to be because the binding force between cBN particles is weak, so that cBN particles are dropped off. For example, WO 2005/066381 (PTL 1) discloses a technique of suppressing the generation of unexpected chipping in the High-cBN sintered material by suitably selecting the bonding material.

CITATION LIST

Patent Literature

PTL 1: WO 2005/066381

SUMMARY OF INVENTION

The cubic boron nitride sintered material according to one aspect of the present disclosure is a cubic boron nitride sintered material including: cubic boron nitride particles in an amount of 70 vol % or more and less than 100 vol %, and a bonding material, wherein the bonding material contains, as constituent elements, at least one first metallic element selected from the group consisting of titanium, zirconium, vanadium, niobium, hafnium, tantalum, chromium, rhenium, molybdenum, and tungsten; cobalt; and aluminum; the cubic boron nitride sintered material has a first interface region that is a region sandwiched between an interface between the cubic boron nitride particles and the bonding material, and a first virtual line passing through a point 10 nm apart from the interface to the bonding material side; and when an element that is present at the highest concentration among the first metallic elements in the first interface region is defined as a first element, an atomic concentration of the first element in the first interface region is higher than an atomic concentration of the first element in the bonding material excluding the first interface region.

The cutting tool according to one aspect of the present disclosure includes the cubic boron nitride sintered material.

DETAILED DESCRIPTION

Problem to be Solved by the Present Disclosure

In recent years, as machinery parts having higher functions have been rapidly developed, it has become more difficult to cut work materials that are formed into machinery parts, at an accelerating pace. In response to this, the problem of an increase in cost due to the shortening of lifetime of cutting tools becomes obvious. Accordingly, a further improvement of the High-cBN sintered material is desired. In view of this, an object of the present disclosure is to provide a cubic boron nitride sintered material capable of prolonging the lifetime, and a cutting tool including thereof.

Advantageous Effect of the Present Disclosure

The present disclosure can provide a cubic boron nitride sintered material capable of prolonging the lifetime, and a cutting tool including thereof.

DESCRIPTION OF EMBODIMENTS

To solve the problem, the present inventors have intensively studied the cause of the shortening of lifetime of the High-cBN sintered material, and as a result, found that the bonding strength at the interface between cBN particles and the bonding material becomes weak due to the low affinity between cBN particles and cobalt (Co) in the bonding material, so that the dropping of cBN particles and the like occurs during cutting. Based on the finding, the present inventors have come up with an improvement of the bonding strength between cBN particles and the bonding material by allowing the metal element having a high affinity with cBN particles to be present around cBN particles at a high concentration at the interface between cBN particles and the bonding material, and then sintering cBN particles and the bonding material. Consequently, dropping and the like of cBN particles can be suppressed during cutting, and thus the present inventors have arrived at the present disclosure that enables prolongation of the lifetime. Further, it has also been found that, when the metal element having a high affinity with cBN particles is allowed to be present at a high concentration at the interface between cBN particles and the bonding material, the thermal cracking is suppressed because thermal shrinkage caused by the heat generated during cutting is lessened. Consequently, the stability against chipping is significantly improved in the present disclosure. Hereinafter, the embodiments of the present disclosure will be first listed and described.

[1] The cubic boron nitride sintered material according to one aspect of the present disclosure is a cubic boron nitride sintered material including: cubic boron nitride particles in an amount of 70 vol % or more and less than 100 vol %, and a bonding material, wherein the bonding material contains, as constituent elements, at least one first metallic element selected from the group consisting of titanium, zirconium, vanadium, niobium, hafnium, tantalum, chromium, rhenium, molybdenum, and tungsten; cobalt; and aluminum; the cubic boron nitride sintered material has a first interface region that is a region sandwiched between an interface between the cubic boron nitride particles and the bonding material, and a first virtual line passing through a point 10 nm apart from the interface to the bonding material side; and when an element that is present at the highest concentration among the first metallic elements in the first interface region is defined as a first element, an atomic concentration of the first element in the first interface region is higher than an atomic concentration of the first element in the bonding material excluding the first interface region. When the cubic boron nitride sintered material having such features is applied to a cutting tool, prolongation of the lifetime of the cutting tool can be achieved.

[2] The cubic boron nitride sintered material preferably has a second interface region that is a region sandwiched between the interface and a second virtual line passing through a point 2 nm apart from the interface to the bonding material side, and an atomic concentration of the first element in the second interface region is preferably 0.7 atom % or more and 10 atom % or less. Consequently, prolongation of the lifetime of the cutting tool can be more sufficiently achieved.

[3] The cubic boron nitride sintered material preferably includes the cubic boron nitride particles in an amount of 85 vol % or more and 95 vol % or less. Consequently, prolongation of the lifetime of a cutting tool can be achieved with the cubic boron nitride sintered material having a significantly high content of cBN particles.

[4] The first metallic element is preferably at least one selected from the group consisting of zirconium, niobium, chromium, molybdenum, and tungsten.

Consequently, prolongation of the lifetime of the cutting tool can be more sufficiently achieved.

[5] The first metallic element is preferably zirconium. Consequently, prolongation of the lifetime of the cutting tool can be further sufficiently achieved.

[6] The cutting tool according to one aspect of the present disclosure includes the cubic boron nitride sintered material. The cutting tool having such a feature can achieve prolongation of the lifetime.

Details of Embodiments of the Present Invention

Hereinafter, one embodiment of the present invention (hereinafter, also referred to as the "present embodiment") will be described. However, the present embodiment is not limited to these. As used herein, the description of a form of "A to B" means the upper and lower limits of the range (that is, A or more and B or less), and when the unit is not described with respect to A and the unit is only described with respect to B, the unit of A is identical to the unit of B. Further, when a compound and the like are represented by a chemical formula in the present specification, unless the atomic ratio is not particularly limited, any conventionally known atomic ratio is included and is not necessarily limited to the stoichiometric range.

Cubic Boron Nitride Sintered Material (cBN Sintered Material)

The cubic boron nitride sintered material (cBN sintered material) according to the present embodiment is a cBN sintered material including cubic boron nitride particles (cBN particles) in an amount of 70 vol % or more and less than 100 vol % and a bonding material. The bonding material contains, as constituent elements, at least one first metallic element selected from the group consisting of titanium, zirconium, vanadium, niobium, hafnium, tantalum, chromium, rhenium, molybdenum, and tungsten; cobalt; and aluminum. cBN sintered material has a first interface region that is a region sandwiched between an interface between cBN particles and the bonding material, and a first virtual line passing through a point 10 nm apart from the interface to the bonding material side. When an element that is present at the highest concentration among the first metallic elements in the first interface region is defined as a first element, an atomic concentration of the first element in the first interface region is higher than an atomic concentration of the first element in the bonding material excluding the first interface region. When cBN sintered material having such features is applied to a cutting tool, prolongation of the lifetime of the cutting tool can be achieved.

<Cubic Boron Nitride Particles (cBN Particles)> cBN sintered material according to the present embodiment includes, as described above, cBN particles in an amount of 70 vol % or more and less than 100 vol %. cBN sintered material preferably includes cBN particles in an amount of 70 vol % or more and 99 vol % or less. Also, cBN sintered material preferably includes cBN particles in an amount of 85 vol % or more and 95 vol % or less. That is, cBN sintered material is a so-called High-cBN sintered material. cBN particles have high hardness, strength, and toughness, and play a role as the skeleton in cBN sintered material. The content (vol %) of cBN particles in cBN sintered material is substantially identical to the content (vol %) of cBN raw material powder used in the mixed powder described below. Note that, substances in a capsule into which the mixed powder is inserted may be molten during ultra-high pressure sintering. However, since the amount of the molten substance is a trace, the content of cBN particles in cBN sintered material can be considered to be substantially identical to the content of cBN raw material powder in the mixed powder. Thus, the content of cBN particles in cBN sintered material can be adjusted to the desired range by controlling the content of cBN raw material powder used in the mixed powder.

The content (vol %) of cBN particles in cBN sintered material can be assessed by subjecting cBN sintered material to quantitative analysis by inductively coupled plasma spectrometry (ICP), tissue observation, elemental analysis, or the like using an energy dispersive X-ray analyzer (EDX) equipped with a scanning electron microscope (SEM) or EDX equipped with a transmission electron microscope (TEM).

For example, when the SEM is used, the content (vol %) of cBN particles can be determined as follows. First, cBN sintered material is cut at any position to produce a sample including a cross section of cBN sintered material. For the production of the cross section, a focused ion beam system, a cross section polisher, or the like can be used. Then, the cross section is observed by the SEM at a magnification of 2,000 times to obtain a backscattered electron image. In the backscattered electron image, the region where cBN particles are present appears as a black region, and the region where the bonding material is present appears as a gray region or a white region.

Then, the backscattered electron image is subjected to binarization processing using an image analysis software (for example, "WinROOF" of MITANI CORPORATION), and each area ratio is determined from the image after the binarization processing. Then, by considering that the area ratio continues in the depth direction of the cross section, the area ratio can be determined as the content (vol %) of cBN particles in cBN sintered material. Note that, the content (vol %) of the bonding material described below can be determined by this measurement method, at the same time.

The $D_{50}$ (mean particle size) of cBN particles based on the area is not particularly limited, and for example, may be 0.1 to 10 µm. Usually, there are tendencies that the smaller the $D_{50}$, the higher the hardness of cBN sintered material, and the smaller the dispersion of the particle size, the more homogeneous the properties of cBN sintered material. The $D_{50}$ of cBN particles is preferably 0.5 to 4 km.

The $D_{50}$ of cBN particles can be determined as follows. First, a sample including the cross section of cBN sintered material is produced according to the method for measuring the content of cBN particles described above to obtain a backscattered electron image. Then, the equivalent circle diameter of each black region in the backscattered electron image is calculated using the image analysis software. In this case, it is preferable to calculate equivalent circle diameters of 100 or more cBN particles by observing 5 or more fields of view.

Then, the cumulative distribution is determined by arranging each equivalent circle diameter from the minimum value to the maximum value in ascending order. The particle size at which the cumulative area is 50% in the cumulative distribution is $D_{50}$. The equivalent circle diameter means the diameter of a circle having an area equal to the area of cBN particle measured.

<Bonding Material: Composition Other than cBN Particles> cBN sintered material according to the present embodiment includes the bonding material as described above. Further, cBN sintered material may include inevitable impurities due to the raw material to be used, manufacturing conditions, and the like. In this case, cBN sintered material may be composed of cBN particles, the bonding material, and inevitable impurities. The content (vol %) of the bonding material is preferably more than 0 vol % and 30 vol % or less, more preferably 1 vol % or more and 30 vol % or less, and further preferably 5 to 15 vol %. The bonding material plays a role to enable cBN particle which is a sintering resistant material to be sintered at an industrial-level pressure temperature.

The bonding material contains, as constituent elements, at least one first metallic element selected from the group consisting of titanium (Ti), zirconium (Zr), vanadium (V), niobium (Nb), hafnium (Hf), tantalum (Ta), chromium (Cr), rhenium (Re), molybdenum (Mo), and tungsten (W); cobalt (Co); and aluminum (Al). Al is preferably contained in the bonding material as an Al compound. Examples of the Al compound include CoAl, $Al_2O_3$, AlN, and $AlB_2$, and composite compounds thereof. Further, W is preferably contained in the bonding material as WC (tungsten carbide). These components in the bonding material are considered to be particularly effective to prolong the lifetime of cBN sintered material for the following reasons.

First, since Co and Al have catalytic functions, they can promote bonding between cBN particles in the sintering step described below. Second, WC is inferred to be effective to bring the coefficient of thermal expansion of the bonding material close to the coefficient of thermal expansion of cBN particles. Note that the catalytic function of Al means a function of promoting diffusion and precipitation of B (boron) and N (nitrogen) constituting cBN particles through Al.

Third, when the bonding material contains the first metallic element as a constituent element, the first metallic element has a high affinity with cBN particles, and therefore the binding force at the interface between cBN particles and the bonding material can be improved.

Here, the first metallic element is preferably at least one selected from the group consisting of zirconium, niobium, chromium, molybdenum, and tungsten. The first metallic element is more preferably zirconium. Consequently, the binding force at the interface between cBN particles and the bonding material can be more sufficiently improved.

The composition of the bonding material can be specified by combining XRD (X-ray diffraction measurement) and ICP. Specifically, first, a test specimen having a thickness of about 0.45 to 0.5 mm is cut out from cBN sintered material, and the test specimen is subjected to XRD analysis to determine the compound, metal, and the like determined from the X-ray diffraction peak. Next, the test specimen is immersed in fluonitric acid (a mixed acid mixed at a volume ratio of concentrated nitric acid (60%):distilled water:concentrated hydrofluoric acid (47%)=2:2:1) in a sealed container to obtain an acid treatment liquid in which the bonding material is dissolved. Further, the acid treatment liquid is subjected to ICP analysis to quantitatively analyze each metal element. Finally, the results of XRD and the results of ICP analysis are analyzed, so that the composition of the bonding material can be determined.

Examples of the inevitable impurities that may be contained in cBN sintered material according to the present embodiment include iron, magnesium, calcium, sodium, and lithium. The inevitable impurities may be contained in cBN sintered material in an amount of 0.01 mass % or less as a single impurity, or may be contained in an amount of 0.1 mass % or less as the total sum of impurities. In the present specification, the "inevitable impurities" that may be contained in cBN sintered material shall be treated as a third component other than cBN and the bonding material.

<Atomic Concentration of First Element in First Interface Region> cBN sintered material according to the present embodiment has a first interface region that is a region sandwiched between an interface between cBN particles and the bonding material, and a first virtual line passing through a point 10 nm apart from the interface to the bonding material side. When an element that is present at the highest concentration among the first metallic elements in the first interface region is defined as the first element, the atomic concentration of the first element in the first interface region is higher than the atomic concentration of the first element in the bonding material excluding the first interface region. Consequently, in cBN sintered material, the metal element having a high affinity with cBN particles can be present at a high concentration around cBN particles, and thus the binding force between cBN particles and the bonding material can be improved. The atomic concentration of the first element in the first interface region and the atomic concentration of the first element in the bonding material excluding the first interface region can be determined by the analysis using an energy dispersive X-ray analyzer (TEM-EDX) equipped with a transmission electron microscope. Hereinafter, the analysis method using TEM-EDX will be described.

(Analysis by TEM-EDX)

<Measurement of Atomic Concentration of First Element in First Interface Region>

First, a sample is collected from cBN sintered material, and a sliced piece having a thickness of 30 to 100 nm is produced from the sample using an argon ion slicer. Then, the piece is photographed by TEM (transmission electron microscope) at a magnification such that 10 or more and 30 or less cBN particles corresponding to the mean particle size of cBN particles in the sintered material can be observed in one field of view, thereby obtaining a first image. Further, any one region is selected from regions each including the interface between cBN particle and the bonding material (hereinafter, also referred to as the "interface regions") in the first image. At this time, when the structure of the arbitrarily selected interface region is inclined in the depth direction with respect to the observed field of view, the interface region is excluded from the selection, or the structure of the interface region inclined in the depth direction is set to be perpendicular to the observed field of view by finely adjusting the piece. This is because the structure of the interface is unclear in the state where the structure of the interface region is inclined in the depth direction with respect to the observed field of view, and measurement of the distance from the interface between cBN particles and the bonding material, which will be described later, may not be suitably conducted. Next, positioning is carried out such that the selected interface region passes near the center of the image, and the observation magnification is changed to 2,000,000 times for observation, thereby obtaining a second image having a size of 100 nm×100 nm. In the second image, the interface region is present so as to extend from one end of the image to the other one end (another end) facing the one end, while passing through near the center of the image.

Then, the interface between cBN particle and the bonding material is specified from the interface region in the second image, and subsequently, the first virtual line passing through a point 10 nm apart from the interface to the bonding material side is set. Consequently, the first interface region sandwiched between the interface and the first virtual line is formed in the second image. Further, the first interface region in the second image is subjected to elemental line analysis by EDX in a direction substantially perpendicular to the first virtual line. In this case, the beam spot diameter is set to 0.3 nm or less, and the scanning interval is set to 0.1 to 0.7 nm.

Then, the atomic concentration (atom %) of each element contained as the first metallic element in the first interface region is determined based on the elemental line analysis. Here, the concentration of each element contained as the first metallic element is an average value (average concentration) of the atomic concentration of each element obtained for each beam spot. In addition, the atomic concentration (atom %) of each element contained as the first metallic element is determined on the basis that all the elements measured in the beam spot, that is, in the measurement field of view is 100 atom %. Consequently, the first element that is present at the highest concentration among the first metallic elements in the first interface region can be specified. For example, the first element that is present at the highest concentration among the first metallic elements in the first interface region is preferably 0.7 to 10 atom % or less.

<Measurement of Atomic Concentration of First Element in Bonding Material Excluding First Interface Region>

On the other hand, the atomic concentration of the first element in the bonding material excluding the first interface region can be determined by, for example, the following method. That is, virtual lines that pass through points 15 nm and 30 nm apart from the interface specified in the interface region in the second image to the bonding material side are set (hereinafter, also referred to as "virtual line A" and "virtual line B", respectively). Consequently, a region sandwiched between the virtual line A and the virtual line B (hereinafter, also referred to as "the bonding material region excluding the first interface region") is formed in the second image. Then, the bonding material region excluding the first interface region is subjected to elemental line analysis by EDX in a direction substantially perpendicular to either the virtual line A or the virtual line B. Also, in this case, the beam spot diameter is set to 0.3 nm or less, and the scanning interval is set to 0.1 to 0.7 nm. The concentration (atom %) of the first element in the bonding material region excluding the first interface region can be determined from the elemental line analysis (the atomic concentration of the first element in this case is also an average value (average concentration) of the concentration of each element obtained for each beam spot). For example, the first element in the bonding material region excluding the first interface region is preferably 0.01 to 0.3 atom % or less.

Here, in the present specification, the atomic concentration of the first element in the first interface region and the atomic concentration of the first element in the bonding material excluding the first interface region are average concentrations obtained by averaging each atomic concentration obtained from the second images at 6 fields of view, from the viewpoint of suppressing measurement error. That is, the second images at 6 fields of view are prepared from cBN sintered material sample, the second images are subjected to the TEM-EDX analysis described above to obtain respective atomic concentrations of the first element in six first interface regions and respective atomic concentrations of the first element in six bonding material regions excluding the first interface regions, and the average concentrations thereof are determined.

<Atomic Concentration of First Element in Second Interface Region> cBN sintered material according to the present embodiment has a second interface region that is a region sandwiched between the interface and a second virtual line passing through a point 2 nm apart from the interface to the bonding material side, and the atomic concentration of the first element in the second interface region is preferably 0.7 atom % or more and 10 atom % or less. The binding force between cBN particles and the bonding material at the interface between cBN particles and the bonding material can be more sufficiently improved.

The atomic concentration of the first element in the second interface region can be determined in the same manner as the determination of the atomic concentration of the first element in the first interface region. That is, the atomic concentration (atom %) of the first element in the second interface region can be determined by subjecting the second interface region to the elemental line analysis by EDX described above in a direction substantially perpendicular to the second virtual line.

<Action>

In cBN sintered material according to the present embodiment, when an element that is present at the highest concentration among the first metallic elements in the first interface region is defined as the first element, the atomic concentration of the first element in the first interface region is higher than the atomic concentration of the first element in the bonding material excluding the first interface region. In this case, it is inferred that, since the binding force between cBN particles and the bonding material is enhanced based on the following reasons, cBN sintered material can suppress dropping and the like of cBN particles during cutting, and thus prolongation of the lifetime is achieved. That is, since the first interface region refers to the interface between cBN particles and the bonding material as well as the region adjacent thereto, it means in cBN sintered material according to the present embodiment that the atomic concentration of the first element is particularly high around cBN particles, among the first metallic elements having a high affinity with cBN particles. Thus, it is considered that many first elements react with cBN particles during sintering in cBN sintered material, and the binding force between cBN particles and the bonding material at the interface is thereby significantly improved. In particular, it is considered that, when the atomic concentration of the first element is 0.7 atom % or more and 10 atom % or less in the second interface region, the first element is present at a high concentration in the vicinity of the interface between cBN particles and the bonding material, and thus the improvement in the binding force at the interface between cBN particles and the bonding material is significant. For the reasons, it is inferred that cBN sintered material according to the present embodiment can suppress dropping and the like of cBN particles during cutting, and thus prolongation of the lifetime is enabled.

[Cutting Tool]

The cutting tool according to the present embodiment includes cBN sintered material. Specifically, the cutting tool preferably includes cBN sintered material as the base material. A part of or the whole surface of cBN sintered material to be the base material may be coated with a coating.

The shape and application of the cutting tool according to the present embodiment are not particularly limited. Examples of the shape and application of the cutting tool include drills, end mills, replaceable cutting tips for drills, replaceable cutting tips for end mills, replaceable cutting tips for milling, replaceable cutting tips for turning, metal slitting saws, gear cutting tools, reamers, taps, and tips for pin milling of crankshafts.

Further, the cutting tool according to the present embodiment includes not only those in which the whole tool is composed of cBN sintered material, but also those in which only a part of the tool (in particular, such as the cutting edge part (cutting blade portion)) is composed of cBN sintered material. For example, those in which only the cutting edge part of the base (support) composed of cemented carbide or the like is constituted by cBN sintered material are also included in the cutting tool according to the present embodiment. In this case, the cutting edge part can be literally regarded as a cutting tool. In other words, even when cBN sintered material occupies only a part of the cutting tool, cBN sintered material is referred to as the cutting tool.

The cutting tool according to the present embodiment may include a coating that at least coats the cutting edge part. In this case, a coating may be formed on the cutting edge part in cBN sintered material by a conventionally known method. Examples of the method for forming the coating include physical vapor deposition methods such as an ion plating method, an arc ion plating method, a sputtering method, and an ion mixing method. Further, a coating may also be formed by a chemical vapor deposition method. The composition of the coating is not particularly limited, and any conventionally known coating can be employed. Examples of the composition of the coating include AlTiSiN, AlCrN, TiZrSiN, CrTaN, HfWSiN, CrAlN, TiN, TiBNO, TiCN, TiCNO, $TiB_2$, TiAlN, TiAlCN, TiAlON, TiAlONC, and $Al_2O_3$.

Since including cBN sintered material, the cutting tool according to the present embodiment can suppress dropping and the like of cBN particles during cutting, and thus prolongation of the lifetime is enabled.

[Method for Manufacturing Cubic Boron Nitride Sintered Material]

The method for manufacturing cBN sintered material according to the present embodiment should not be particularly limited, as long as a cBN sintered material capable of prolonging the lifetime can be obtained when being applied to a cutting tool, as described above. However, from the viewpoint of yield and the like, it is preferable to obtain cBN sintered material, for example, by the following manufacturing method. The present inventors have found that the first metallic element is allowed to be present at a high concentration around cBN particles by preparing a raw material powder for the bonding material containing the first metallic element that can enhance the binding force with cBN particles as described below, removing the impurities in the bonding material, making cBN particle surface N-rich, and the like, in a process for manufacturing cBN sintered material, and thus a cBN sintered material capable of prolonging the lifetime can be manufactured. Here, in the present specification, "making cBN particle surface N-rich" refers to increasing the concentration of the nitrogen (N) element on cBN particle surface, or imparting functional groups including N to cBN particle surface.

Specifically, the method for manufacturing cBN sintered material according to the present embodiment preferably includes a step of preparing a raw material powder for a bonding material that enhances the binding force with cBN particles, and subjecting the raw material powder for the bonding material to heat treatment in a low oxygen atmosphere to remove impurities (first step), a step of preparing a cBN raw material powder and making cBN particle surface in cBN raw material powder N-rich (second step), a step of mixing the raw material powder for the bonding material and cBN raw material powder to prepare a mixed powder including cBN powder in an amount of 70 vol % or more and less than 100 vol % and the balance of the raw material powder for the bonding material (third step), and a step of sintering the mixed powder to obtain a cBN sintered material (fourth step). Hereinafter, each step will be described in detail.

<First Step>

The first step is a step of preparing a raw material powder for a bonding material that enhances the binding force with cBN particles, and subjecting the raw material powder for the bonding material to heat treatment in a low oxygen atmosphere to remove impurities. The raw material powder for the bonding material can be prepared as follows. First, for example, a WC powder, a Co powder, and an Al powder are manufactured by a conventionally known method or obtained from the market for preparation. Further, to allow at least one first metallic element selected from the group consisting of Ti, Zr, V, Nb, Hf, Ta, Cr, Re, Mo, and W to be contained as the constituent element in the raw material powder for the bonding material, it is preferable to manufacture a powder of a nitride, a carbide, a carbonitride, or a hydride of at least one first metallic element selected from the above group by a conventionally known method or to obtain the powder from the market for preparation. Then, the powders described above are mixed under inert atmosphere conditions to be a predetermined ratio, and subsequently pulverized under inert atmosphere conditions by a wet ball mill, a wet bead mill, or the like to prepare the raw material powder for the bonding material. By mixing and pulverizing the powders under inert atmosphere conditions, inclusion of oxygen and oxidation of the elements in the powders can be prevented.

Here, it is preferable that the Al content in the raw material powder for the bonding material be 20 to 40 mass %, thereby increasing the amount of Al blended as compared with conventional bonding materials of this kind. Consequently, Co in the bonding material is alloyed, so that the first element is more likely to be diffused in the vicinity of the interface with cBN particles during sintering as compared with Co. The method for mixing the powders is not particularly limited, but ball mill mixing, bead mill mixing, planetary mill mixing, or jet mill mixing is preferable from the viewpoint of efficiently and homogeneously mixing the powders. Each mixing method may be wet or dry.

Further in the first step, the raw material powder for the bonding material is subjected to heat treatment in a low oxygen atmosphere to remove impurities. Specifically, it is preferable that the raw material powder for the bonding material be subjected to reduction treatment. For example, reduction treatment is carried out by heating the raw material powder for the bonding material under argon atmosphere with a low oxygen partial pressure. The heating temperature at this time is preferably 700 to 900° C. Consequently, impurities such as oxygen can be further removed from the raw material powder for the bonding material.

<Second Step>

The second step is a step of preparing a cBN raw material powder and making cBN particle surface in cBN raw material powder N-rich. As cBN raw material powder, a commercially available cBN powder may be used, or a cBN powder obtained from B and N by a conventionally known ultra-high pressure synthesis method may be used. The present inventors have demonstrated that oxide is present on the surface of this cBN powder. This is considered to be because the ultra-high pressure synthesized cBN powder is subjected to washing treatment, and cBN powder is exposed to air atmosphere. Thus, it is preferable to make cBN particle surface in cBN raw material powder N-rich to reduce the amount of oxide.

Examples of the method for making cBN particle surface N-rich include a method in which heat treatment is carried out under ammonium-containing gas atmosphere. Specifically, cBN raw material powder is exposed to an ammonium-containing gas atmosphere. By exposing cBN raw material powder to an ammonium-containing gas atmosphere, oxygen is reduced on cBN particle surface, and at the same time, cBN particle surface can be made N-rich.

In the second step, the average particle size of cBN particles is not particularly limited. From the viewpoint of forming a cBN sintered material having high strength, and excellent abrasion resistance and chipping resistance, the average particle size of cBN particles is preferably 0.1 to 10 μm, and more preferably 0.5 to 5 μm. Thus, cBN raw material powder in which the oxide film formed on cBN particle surface is securely removed and which contains N-rich cBN particles can be obtained.

Here, when a cBN sintered material containing, for example, Zr as the first metallic element which is the constituent element of the bonding material is manufactured, it is preferable in the second step that cBN raw material powder described above be prepared, and thereafter, cBN raw material powder be coated with Zr. Consequently, the Zr component is likely to be selectively arranged around cBN particles. This is not limited to Zr, and the same applies to other first metallic elements. That is, in the second step, after cBN raw material powder described above is prepared, cBN raw material powder is coated with the first metallic element, so that the first metallic element is likely to be selectively arranged around cBN particles. As a specific method for coating cBN raw material powder with the first metallic element such as Zr, at least one of sputtering, an AIP method, an HIPIMS method, a CVD method, and an arc plasma deposition method (APD method) may be used.

<Third Step>

The third step is a step of mixing the raw material powder for the bonding material and cBN raw material powder to prepare a mixed powder including cBN powder in an amount of 70 vol % or more and less than 100 vol % and the balance of the raw material powder for the bonding material.

Specifically, it is preferable in the third step that the raw material powder for the bonding material and cBN raw material powder be mixed by wet ball mill using ethanol, acetone, or the like as a solvent to prepare the mixed powder. After preparation of the mixed powder, the solvent is removed by natural drying. Further, it is preferable to subject the mixed powder to heat treatment (for example, 850° C. or more under vacuum) because impurities such as the moisture adsorbed to the surface can be removed.

<Fourth Step>

The fourth step is a step of sintering the mixed powder to obtain a cBN sintered material. In this step, the mixed powder is sintered by being exposed to high temperature and high pressure conditions, so that cBN sintered material is manufactured. Specifically, in the fourth step, the vacuum-sealed mixed powder is subjected to sintering treatment by using an ultra-high temperature and high pressure apparatus. The temperature conditions for sintering treatment are preferably 1,500° C. or more and less than 2,000° C., and more preferably 1,600 to 1,900° C. The holding time is preferably 10 to 50 minutes. The sintering pressure conditions are not particularly limited, but are preferably 5.5 to 8 GPa. Thus, cBN sintered material can be manufactured.

<Effect>

The method for manufacturing cBN sintered material according to the present embodiment can manufacture a cBN sintered material capable of prolonging the lifetime by performing each step.

Examples

Hereinafter, the present invention will be described in more detail with reference to Examples, but the present invention is not limited to these.

[Production of Samples]

cBN sintered bodies of sample 1 to sample 41 were produced in accordance with the following procedure.

<Sample 1>

(First Step)

First, a WC powder, a Co powder, an Al powder, and a Zr carbide powder which are commercially available were prepared. Then, the powders described above were blended by ball mill mixing such that WC:Co:Al:ZrC was 22:45:28:5 in a mass ratio. The mean particle size of the powders was 2 μm. Further, the powder blended in the mass ratio was subsequently pulverized by ball mill mixing to prepare a raw material powder for the bonding material. Subsequently, reduction treatment was carried out by heating the raw material powder for the bonding material under argon atmosphere with a low oxygen partial pressure. Thus, the raw material powder for the bonding material was prepared. The reduction treatment (heat treatment) was carried out under extremely low oxygen conditions of $1\times10^{-29}$ atm or less, the keeping temperature being 800° C., and the heat treatment keeping time being 3 hours.

(Second Step)

A cBN raw material powder having a mean particle size of 2 μm was prepared by a conventionally known ultra-high pressure synthesis method. Further, cBN raw material powder was subjected to reduction treatment under ammonium atmosphere under the following heat treatment conditions to make cBN particle surface N-rich.

<Heat Treatment Conditions>
Ammonium flow rate: 0.5 L/min
Nitrogen flow rate: 5 L/min
Furnace pressure: atmospheric pressure
Furnace temperature: 700° C.
Holding time: 3 hours.
(Third Step)

cBN raw material powder and the raw material powder for the bonding material were blended such that cBN raw material powder:the raw material powder for the bonding material was 60:40 in a volume ratio, and uniformly mixed by a wet ball mill method using ethanol. Thereafter, the solvent was removed by natural drying, and the mixed powder was subjected to heat treatment under vacuum at 900° C. Thus, the mixed powder was prepared.

(Fourth Step)

The mixed powder was sintered to produce a cBN sintered material. Specifically, the mixed powder was charged in a container made of Ta (tantalum) in a state of being in contact with a disc made of WC-6% Co cemented carbide, and vacuum sealed. Then, this was sintered using a belt-type ultra-high pressure and high temperature generator under the conditions of 6.5 GPa and 1,650° C. for 20 minutes. Thus, cBN sintered material of sample 1 was produced.

<Sample 2> cBN sintered material of sample 2 was produced in the same manner as sample 1, except that, in the third step, blending was carried out such that cBN raw material powder:raw material powder for the bonding material was 70:30 in a volume ratio.

<Sample 3> cBN sintered material of sample 3 was produced in the same manner as sample 1, except that, in the third step, blending was carried out such that cBN raw material powder:the raw material powder for the bonding material was 80:20 in a volume ratio.

<Sample 4> cBN sintered material of sample 4 was produced in the same manner as sample 1, except that, in the third step, blending was carried out such that cBN raw material powder:the raw material powder for the bonding material was 91:9 in a volume ratio.

<Sample 5> cBN sintered material of sample 5 was produced in the same manner as sample 1, except that, in the third step, blending was carried out such that cBN raw material powder:the raw material powder for the bonding material was 95:5 in a volume ratio.

<Sample 6> cBN sintered material of sample 6 was produced in the same manner as sample 1, except that, in the third step, blending was carried out such that cBN raw material powder:the raw material powder for the bonding material was 99:1 in a volume ratio.

<Sample 7> cBN sintered material of sample 7 was produced in the same manner as sample 1, except that, in the third step, cBN raw material powder and the raw material powder for the bonding material were not blended, and in the fourth step, 100 mass % of cBN raw material powder was sintered.

<Sample 8> cBN sintered material of sample 8 was produced in the same manner as sample 1, except that the first step and the second step described above were not carried out, and in the third step, the raw material powder for the bonding material obtained by blending WC powder, Co powder, Al powder, and Zr carbide powder such that WC:Co:Al:ZrC was 22:45: 28:5 in a mass ratio, and cBN powder obtained by the ultra-high pressure synthesis method were prepared, and these were blended such that cBN powder:the raw material powder for the bonding material was 91:9 in a volume ratio to obtain a mixed powder. The second image obtained from sample 8 was subjected to analysis by TEM-EDX, and as a result, W was not detected in the first interface region and the second interface region. The cause thereof was estimated that the mixed powder was obtained from the raw material powder for the bonding material and cBN powder in the third step without carrying out the first step and the second step.

<Sample 9> cBN sintered material of sample 9 was produced in the same manner as sample 4, except that, in the first step, the raw material powder for the bonding material obtained by blending WC powder, Co powder, and Al powder such that WC:Co:Al was 35:45:20 in a mass ratio was prepared, and in the second step, cBN raw material powder was coated with Zr by APD method under the following coating conditions.

<Coating Conditions>
Coating apparatus: nanoparticles forming apparatus APD-P manufactured by ADVANCE RIKO, Inc.
Target: zirconium
Introduction gas: argon gas was introduced after vacuuming under $10^{-4}$ Pa
Discharge voltage: 150 V
Discharge frequency: 6 Hz
Condenser capacity: 1,080 pF
Shot number: 1,000
Amount of powder treated: 25 g
Number of revolutions of powder container: 50 rpm.

<Sample 10> cBN sintered material of sample 10 was produced in the same manner as sample 9, except that the shot number was changed to 50,000 under the coating conditions where cBN raw material powder prepared in the second step was coated with Zr by APD method.

<Sample 11> cBN sintered material of sample 11 was produced in the same manner as sample 4, except that the coating of cBN raw material powder prepared in the second step with Zr by APD method carried out in the production of sample 9 was carried out under the same coating conditions as sample 9 except that the shot number was set to 80,000.

<Sample 12> cBN sintered material of sample 12 was produced in the same manner as sample 11, except that the shot number was changed to 100,000 under the coating conditions where cBN raw material powder prepared in the second step was coated with Zr by APD method.

<Sample 13> cBN sintered material of sample 13 was produced in the same manner as sample 11, except that the shot number was changed to 200,000 under the coating conditions where cBN raw material powder prepared in the second step was coated with Zr by APD method.

<Sample 14> cBN sintered material of sample 14 was produced in the same manner as sample 4, except that, in the first step, WC powder, Co powder, and Al powder were prepared, and the powders described above were blended such that WC:Co:Al was 38:42:20 in a mass ratio.

<Sample 15> cBN sintered material of sample 15 was produced in the same manner as sample 4, except that, in the first step, WC powder, Co powder, Al powder, and a commercially available metal Cr powder were prepared, and the powders described above were blended such that WC:Co:Al:Cr was 22:44:25:9 in a mass ratio.

<Sample 16> cBN sintered material of sample 16 was produced in the same manner as sample 4, except that, in the first step, WC powder, Co powder, Al powder, and a commercially available Hf carbide powder were prepared, and the powders described above were blended such that WC:Co:Al:HfC was 22:46:25:7 in a mass ratio.

<Sample 17> cBN sintered material of sample 17 was produced in the same manner as sample 4, except that, in the first step, WC powder, Co powder, Al powder, and a commercially available Ta carbide powder were prepared, and the powders described above were blended such that WC:Co:Al:TaC was 22:46:26:6 in a mass ratio.

<Sample 18> cBN sintered material of sample 18 was produced in the same manner as sample 4, except that, in the first step, WC powder, Co powder, Al powder, and a commercially available Mo carbide powder were prepared, and the powders described above were blended such that WC:Co:Al:MoC was 20:47:25:8 in a mass ratio.

<Sample 19> cBN sintered material of sample 19 was produced in the same manner as sample 4, except that, in the first step, WC powder, Co powder, Al powder, and a commercially available Ti carbide powder were prepared, and the powders described above were blended such that WC:Co:Al:TiC was 20:46:25:9 in a mass ratio.

<Sample 20> cBN sintered material of sample 20 was produced in the same manner as sample 4, except that, in the first step, WC powder, Co powder, Al powder, and a commercially available V carbide powder were prepared, and the powders described above were blended such that WC:Co:Al:VC was 20:47:25:8 in a mass ratio.

<Sample 21> cBN sintered material of sample 21 was produced in the same manner as sample 4, except that, in the first step, WC powder, Co powder, Al powder, and a commercially available Nb carbide powder were prepared, and the powders described above were blended such that WC:Co:Al:NbC was 20:44:30:6 in a mass ratio.

<Sample 22> cBN sintered material of sample 22 was produced in the same manner as sample 4, except that, in the first step, WC powder, Co powder, Al powder, and a commercially available Re carbide powder were prepared, and the powders described above were blended such that WC:Co:Al:ReC was 23:45:25:7 in a mass ratio.

<Sample 23> cBN sintered material of sample 23 was produced in the same manner as sample 1, except that the first step and the second step described above were not carried out, and in the third step, the raw material powder for the bonding material obtained by blending WC powder, Co powder, Al powder, and a commercially available W powder such that WC:Co:Al:W was 22:45:28:5 in a mass ratio, and cBN powder obtained by the ultra-high pressure synthesis method were prepared, and these were blended such that cBN powder:the raw material powder for the bonding material was 91:9 in a volume ratio to obtain a mixed powder.

<Sample 24> cBN sintered material of sample 24 was produced in the same manner as sample 23, except that the first step and the second step described above were not carried out, and in the third step, the raw material powder for the bonding material in which WC powder, Co powder, Al powder, and Cr powder were blended such that WC:Co:Al:Cr was 22:45:28:5 in a mass ratio was prepared.

<Sample 25> cBN sintered material of sample 25 was produced in the same manner as sample 23, except that the first step and the second step described above were not carried out, and in the third step, the raw material powder for the bonding material obtained by blending WC powder, Co powder, Al powder, and a commercially available Hf powder such that WC:Co:Al:Hf was 22:45:28:5 in a mass ratio was prepared.

<Sample 26> cBN sintered material of sample 26 was produced in the same manner as sample 23, except that the first step and the second step described above were not carried out, and in the third step, the raw material powder for the bonding material obtained by blending WC powder, Co powder, Al powder, and a commercially available Ta powder such that WC:Co:Al:Ta was 22:45:28:5 in a mass ratio was prepared.

<Sample 27> cBN sintered material of sample 27 was produced in the same manner as sample 23, except that the first step and the second step described above were not carried out, and in the third step, the raw material powder for the bonding material obtained by blending WC powder, Co powder, Al powder, and a commercially available Mo powder such that WC:Co:Al:Mo was 22:45:28:5 in a mass ratio was prepared.

<Sample 28> cBN sintered material of sample 28 was produced in the same manner as sample 23, except that the first step and the second step described above were not carried out, and in the third step, the raw material powder for the bonding material obtained by blending WC powder, Co powder, Al powder, and a commercially available Ti powder such that WC:Co:Al:Ti was 22:45:28:5 in a mass ratio was prepared.

<Sample 29> cBN sintered material of sample 29 was produced in the same manner as sample 23, except that the first step and the second step described above were not carried out, and in the third step, the raw material powder for the bonding material obtained by blending WC powder, Co powder, Al powder, and a commercially available V powder such that WC:Co:Al:V was 22:45:28:5 in a mass ratio was prepared.

<Sample 30> cBN sintered material of sample 30 was produced in the same manner as sample 23, except that the first step and the second step described above were not carried out, and in the third step, the raw material powder for the bonding material obtained by blending WC powder, Co powder, Al powder, and a commercially available Nb powder such that WC:Co:Al:Nb was 22:45:28:5 in a mass ratio was prepared.

<Sample 31> cBN sintered material of sample 31 was produced in the same manner as sample 23, except that the first step and the second step described above were not carried out, and in the third step, the raw material powder for the bonding material obtained by blending WC powder, Co powder, Al powder, and a commercially available Re powder such that WC:Co:Al:Re was 22:45:28:5 in a mass ratio was prepared.

<Sample 32> cBN sintered material of sample 32 was produced in the same manner as sample 4, except that, in the first step, the raw material powder for the bonding material was prepared by blending WC powder, Co powder, Al powder, and Zr carbide powder such that WC:Co:Al:ZrC was 20:43:28:9 in a mass ratio.

<Sample 33> cBN sintered material of sample 33 was produced in the same manner as sample 4, except that, in the first step, the raw material powder for the bonding material was prepared by blending WC powder, Co powder, Al powder, and a commercially available W powder such that WC:Co:Al:W was 20:43:28:9 in a mass ratio.

<Sample 34> cBN sintered material of sample 34 was produced in the same manner as sample 4, except that, in the first step, the raw material powder for the bonding material was prepared by blending WC powder, Co powder, Al powder, and Cr powder such that WC:Co:Al:Cr was 20:43:28:9 in a mass ratio.

<Sample 35> cBN sintered material of sample 35 was produced in the same manner as sample 4, except that, in the first step, the raw material powder for the bonding material was prepared by blending WC powder, Co powder, Al powder, and a commercially available Hf powder such that WC:Co:Al:Hf was 20:43:28:9 in a mass ratio.

<Sample 36> cBN sintered material of sample 36 was produced in the same manner as sample 4, except that, in the first step, the raw material powder for the bonding material was prepared by blending WC powder, Co powder, Al powder, and a commercially available Ta powder such that WC:Co:Al:Ta was 20:43:28:9 in a mass ratio.

<Sample 37> cBN sintered material of sample 37 was produced in the same manner as sample 4, except that, in the first step, the raw material powder for the bonding material was prepared by blending WC powder, Co powder, Al powder, and a commercially available Mo powder such that WC:Co:Al:Mo was 20:43:28:9 in a mass ratio.

<Sample 38> cBN sintered material of sample 38 was produced in the same manner as sample 4, except that, in the first step, the raw material powder for the bonding material was prepared by blending WC powder, Co powder, Al powder, and a commercially available Ti powder such that WC:Co:Al:Ti was 20:43:28:9 in a mass ratio.

<Sample 39> cBN sintered material of sample 39 was produced in the same manner as sample 4, except that, in the first step, the raw material powder for the bonding material was prepared by blending WC powder, Co powder, Al powder, and a commercially available V powder such that WC:Co:Al:V was 20:43:28:9 in a mass ratio.

<Sample 40> cBN sintered material of sample 40 was produced in the same manner as sample 4, except that, in the first step, the raw material powder for the bonding material was prepared by blending WC powder, Co powder, Al powder, and a commercially available Nb powder such that WC:Co:Al:Nb was 20:43:28:9 in a mass ratio.

<Sample 41> cBN sintered material of sample 41 was produced in the same manner as sample 4, except that, in the first step, the raw material powder for the bonding material was prepared by blending WC powder, Co powder, Al powder, and a commercially available Re powder such that WC:Co:Al:Re was 20:43:28:9 in a mass ratio.

[Evaluation]

<Measurement of Atomic Concentration of First Element in First Interface Region, Second Interface Region, and Bonding Material Excluding First Interface Region>

Each cBN sintered material of sample 1 to sample 13 was cut at any position, and the exposed surface was polished to produce a smooth surface. Thereafter, the smooth surface was sliced to have a thickness of 50 nm using an argon ion slicer. Then, the second image (100 nm×100 nm) was subjected to the analysis by TEM-EDX described above according to the method described above. The beam diameter in TEM-EDX was set to 0.2 nm, and the scanning interval was set to 0.6 nm. From the obtained measured values, the atomic concentrations of the first element in the first interface region, the second interface region, and the bonding material excluding the first interface region were determined according to the method described above. The results are shown in Table 1. Sample 2 to sample 6 and sample 9 to sample 13 are Examples, and sample 1 and sample 7 to sample 8 are Comparative Examples. Further, the second image (100 nm×100 nm) was obtained from each cBN sintered material of sample 14 to sample 41 in the same manner as each cBN sintered material of sample 1 to sample 13, and the second image was subjected to the analysis by TEM-EDX. From the obtained measured values, the atomic concentrations of the first element in the first interface region, the second interface region, and the bonding material excluding the first interface region were determined according to the method described above. The results are shown in Table 2. Sample 14 to sample 22 and sample 32 to sample 41 are Examples, and sample 23 to sample 31 are Comparative Examples. In Table 2, the results of sample 4 (Example) and sample 8 (Comparative Example) are also shown to show the results of the cutting test described below.

<First Cutting Test>

From each cBN sintered material of sample 1 to sample 13, cutting tools made of each sample (base material shape: SNGN090308, cutting edge treatment: T01225) were produced. The cutting test (first cutting test) was carried out under the following cutting conditions by using these cutting tools.

<Cutting Conditions>

Cutting speed: 1,450 m/min.
Feeding speed: 0.2 mm/rev.
Depth of cut: 0.3 mm
Coolant: WET
Coolant liquid: Emulsions 96 (diluted to 20-fold with water)
Cutter: RM3080R (manufactured by Sumitomo Electric Industries, Ltd.)
Cutting method: intermittent cutting
Lathe: *NEXUS* 530-II HS (manufactured by YAMAZAKI MAZAK CORPORATION)
Work material: FC250.

The cutting edge was observed every 0.5 km of the cutting distance, and the amount of the dropping of the cutting edge was measured. The amount of dropping of the cutting edge was taken as the width moved backward due to wear from the position of the cutting edge ridge before cutting. When the cutting edge was chipped, the size of chipping was taken as the amount of dropping. The cutting distance at the time when the amount of dropping of the cutting edge reached 0.1 mm or more was measured. The cutting distance was taken as the lifetime of the cutting tool. The results are shown in Table 1. It can be evaluated that the longer the cutting distance becomes, the more the lifetime of the cutting tool is prolonged.

<Second Cutting Test>

From each cBN sintered material of sample 4, sample 8, and sample 14 to sample 41, cutting tools made of each sample (base material shape: TNGA160404, cutting edge treatment: T01225) were produced. The cutting test (second cutting test) was carried out under the following cutting conditions by using these cutting tools.

<Cutting Conditions>

Cutting speed: 300 m/min.
Feeding speed: 0.2 mm/rev.
Depth of cut: 0.1 mm
Coolant: DRY
Cutting method: continuous cutting
Lathe: LB400 (manufactured by Okuma Corporation)
Work material: sintered part (hardened sintered alloy D40 manufactured by Sumitomo Electric Industries, Ltd., the hardness of the hardened cutting part: HRB75).

The cutting edge was observed every 0.1 km of the cutting distance, and the amount of wear of the cutting edge was measured. The cutting distance at the time when the amount of wear of the cutting edge reached 100 μm or more was measured.

The cutting distance was taken as the lifetime of the cutting tool. The results are shown in Table 2 to Table 4. It can be evaluated that the longer the cutting distance becomes, the more the lifetime of the cutting tool is prolonged.

TABLE 1

| Sample No. | cBN content [vol %] | First interface region first element (Zr) concentration [atom %] | Second interface region first element (Zr) concentration [atom %] | (Bonding material) excluding first interface region first element (Zr) concentration [atom %] | Average cutting distance [km] |
|---|---|---|---|---|---|
| 1 | 60 | 0.8 | 2 | 0.3 | 0.6 |
| 2 | 70 | 0.8 | 2 | 0.3 | 1.5 |
| 3 | 85 | 0.8 | 2 | 0.3 | 2.1 |
| 4 | 91 | 0.8 | 2 | 0.3 | 2.4 |
| 5 | 95 | 0.8 | 2 | 0.3 | 2.2 |
| 6 | 99 | 0.8 | 2 | 0.3 | 1.5 |
| 7 | 100 | — | — | — | 0.6 |
| 8 | 91 | 0.3 | 0.3 | 0.3 | 0.4 |
| 9 | 91 | 0.4 | 0.5 | 0.3 | 1.8 |
| 10 | 91 | 0.5 | 0.7 | 0.3 | 2.1 |
| 11 | 91 | 0.8 | 3 | 0.3 | 2.6 |
| 12 | 91 | 5 | 10 | 0.3 | 2.2 |
| 13 | 91 | 7 | 15 | 0.3 | 1.9 |

TABLE 2

| Sample No. | cBN content [vol %] | First interface region first element concentration [atom %] | Second interface region first element concentration [atom %] | (Bonding material) excluding first interface region first element concentration [atom %] | First element | Average cutting distance [km] |
|---|---|---|---|---|---|---|
| 4 | 91 | 0.8 | 2.0 | 0.3 | Zr | 2.8 |
| 8 | 91 | 0.3 | 0.3 | 0.3 | Zr | 0.5 |
| 14 | 91 | 0.8 | 2.1 | 0.3 | W | 2.6 |
| 15 | 91 | 0.8 | 2.1 | 0.2 | Cr | 2.9 |

TABLE 2-continued

| Sample No. | cBN content [vol %] | First interface region first element concentration [atom %] | Second interface region first element concentration [atom %] | (Bonding material) excluding first interface region first element concentration [atom %] | First element | Average cutting distance [km] |
|---|---|---|---|---|---|---|
| 16 | 91 | 0.8 | 2.0 | 0.3 | Hf | 2.3 |
| 17 | 91 | 0.8 | 2.0 | 0.3 | Ta | 2.4 |
| 18 | 91 | 0.7 | 2.0 | 0.3 | Mo | 2.6 |
| 19 | 91 | 0.8 | 2.0 | 0.3 | Ti | 2.2 |
| 20 | 91 | 0.8 | 2.0 | 0.3 | V | 2.1 |
| 21 | 91 | 0.8 | 2.0 | 0.3 | Nb | 2.7 |
| 22 | 91 | 0.8 | 2.0 | 0.3 | Re | 2.2 |

TABLE 3

| Sample No. | cBN content [vol %] | First interface region first element concentration [atom %] | Second interface region first element concentration [atom %] | (Bonding material) excluding first interface region first element concentration [atom %] | First element | Average cutting distance [km] |
|---|---|---|---|---|---|---|
| 23 | 91 | 0.3 | 0.3 | 0.3 | W | 0.4 |
| 24 | 91 | 0.2 | 0.2 | 0.2 | Cr | 0.5 |
| 25 | 91 | 0.3 | 0.3 | 0.3 | Hf | 0.4 |
| 26 | 91 | 0.3 | 0.3 | 0.3 | Ta | 0.4 |
| 27 | 91 | 0.3 | 0.3 | 0.3 | Mo | 0.4 |
| 28 | 91 | 0.3 | 0.3 | 0.3 | Ti | 0.5 |
| 29 | 91 | 0.3 | 0.3 | 0.3 | V | 0.5 |
| 30 | 91 | 0.3 | 0.3 | 0.3 | Nb | 0.4 |
| 31 | 91 | 0.3 | 0.3 | 0.3 | Re | 0.3 |

TABLE 4

| Sample No. | cBN content [vol %] | First interface region first element concentration [atom %] | Second interface region first element concentration [atom %] | (Bonding material) excluding first interface region first element concentration [atom %] | First element | Average cutting distance [km] |
|---|---|---|---|---|---|---|
| 32 | 91 | 1.0 | 5.0 | 0.5 | Zr | 2.7 |
| 33 | 91 | 0.8 | 4.0 | 0.5 | W | 2.5 |
| 34 | 91 | 1.1 | 6.0 | 0.5 | Cr | 2.8 |
| 35 | 91 | 0.8 | 4.0 | 0.5 | Hf | 2.2 |
| 36 | 91 | 0.8 | 4.0 | 0.5 | Ta | 2.3 |
| 37 | 91 | 1.0 | 5.0 | 0.5 | Mo | 2.5 |
| 38 | 91 | 1.1 | 6.0 | 0.5 | Ti | 2.1 |
| 39 | 91 | 1.1 | 6.0 | 0.5 | V | 2.0 |
| 40 | 91 | 1.0 | 5.0 | 0.5 | Nb | 2.6 |
| 41 | 91 | 0.8 | 4.0 | 0.5 | Re | 2.1 |

[Consideration]

According to Table 1, it is recognized that the cutting tools obtained from each cBN sintered material of sample 2 to sample 6 and sample 9 to sample 13 which are Examples have a prolonged lifetime as compared with the cutting tools obtained from each cBN sintered material of sample 1 and sample 7 to sample 8 which are Comparative Examples.

According to Table 2 to Table 4, it is recognized that the cutting tools obtained from each cBN sintered material of sample 4, sample 14 to sample 22 and sample 32 to sample 41 which are Examples have a prolonged lifetime as compared with the cutting tools obtained from each cBN sintered material of sample 8 and sample 23 to sample 31.

Although the embodiments and Examples of the present disclosure have been described above, it is also planned from the beginning to appropriately combine the configurations of the embodiments and Examples described above.

The embodiments and Examples disclosed herein should be considered to be exemplary in all respects and not restrictive. The scope of the present invention is shown by the scope of claims rather than the embodiments and Examples described above, and is intended to include the meaning equivalent to the scope of claims and all modifications within the scope.

The invention claimed is:

1. A cubic boron nitride sintered material comprising: cubic boron nitride particles in an amount of 70 vol % or more and less than 100 vol %, and a bonding material, wherein
the bonding material comprises, as constituent elements, cobalt, aluminum, and at least one first metallic element selected from the group consisting of titanium, zirconium, vanadium, niobium, hafnium, tantalum, chromium, rhenium, molybdenum, and tungsten;
the cubic boron nitride sintered material has a first interface region that is a region sandwiched between an interface formed between a surface of the cubic boron nitride particles and the bonding material, and a first virtual line passing through the bonding material at a point 10 nm apart from the interface to on the bonding material side; and
wherein an element that is present at the highest concentration among the first metallic elements in the first interface region is defined as a first element, an atomic concentration of the first element in the first interface region is higher than an atomic concentration of the first element in the bonding material outside the first interface region.

2. The cubic boron nitride sintered material according to claim 1, wherein the cubic boron nitride sintered material has a second interface region that is a region sandwiched between the interface and a second virtual line passing through a point 2 nm apart from the interface to the bonding material side, and
an atomic concentration of the first element in the second interface region is 0.7 atom % or more and 10 atom % or less.

3. The cubic boron nitride sintered material according to claim 1, wherein the cubic boron nitride sintered material comprises the cubic boron nitride particles in an amount of 85 vol % or more and 95 vol % or less.

4. The cubic boron nitride sintered material according to claim 1, wherein the first metallic element is at least one selected from the group consisting of zirconium, niobium, chromium, molybdenum, and tungsten.

5. The cubic boron nitride sintered material according to claim 1, wherein the first metallic element is zirconium.

6. A cutting tool comprising the cubic boron nitride sintered material according to claim 1.

* * * * *